(12) United States Patent
Baehrle-Miller et al.

(10) Patent No.: US 11,904,825 B2
(45) Date of Patent: Feb. 20, 2024

(54) METHOD AND APPARATUS FOR OPERATING AN ELECTRIC MOTOR FOR AN ELECTRIC BRAKING DEVICE

(71) Applicant: Robert Bosch GmbH, Stuttgart (DE)

(72) Inventors: Frank Baehrle-Miller, Schoenaich (DE); Hubertus Wienken, Langenbrettach (DE); Steffen Zechmeister, Bad Wimpfen (DE); Norbert Kearney, Wuestenrot (DE)

(73) Assignee: Robert Bosch GmbH, Stuttgart (DE)

( * ) Notice: Subject to any disclaimer, the term of this patent is extended or adjusted under 35 U.S.C. 154(b) by 600 days.

(21) Appl. No.: 17/257,798

(22) PCT Filed: May 24, 2019

(86) PCT No.: PCT/EP2019/063490
§ 371 (c)(1),
(2) Date: Jan. 4, 2021

(87) PCT Pub. No.: WO2020/011439
PCT Pub. Date: Jan. 16, 2020

(65) Prior Publication Data
US 2021/0284122 A1    Sep. 16, 2021

(30) Foreign Application Priority Data
Jul. 7, 2018   (DE) .................... 10 2018 211 239.8

(51) Int. Cl.
*B60T 17/22*      (2006.01)
*H02P 23/24*      (2016.01)
(Continued)

(52) U.S. Cl.
CPC ............ *B60T 17/221* (2013.01); *B60T 8/171* (2013.01); *B60T 13/74* (2013.01); *H02P 23/24* (2016.02); *B60T 2270/406* (2013.01)

(58) Field of Classification Search
CPC .. B60T 13/74; B60T 17/221; B60T 2270/406; B60T 8/171; H02P 23/24; H02P 29/02
See application file for complete search history.

(56) References Cited

U.S. PATENT DOCUMENTS 4,350,229 A * 9/1982 Ito .................. F16D 55/227
188/73.32
7,152,716 B2 * 12/2006 Taylor .................. F16D 65/18
188/71.8
(Continued)

FOREIGN PATENT DOCUMENTS

CN        106715184 A      5/2017
DE    10 2004 002 127 A1   8/2005
(Continued)

OTHER PUBLICATIONS

International Search Report corresponding to PCT Application No. PCT/EP2019/063490, dated Sep. 4, 2019 (German and English language document) (5 pages).

*Primary Examiner* — Babar Sarwar
(74) *Attorney, Agent, or Firm* — Maginot, Moore & Beck LLP

(57) ABSTRACT

A method for operating an electric motor for an electric braking device, in particular for an electric parking brake of a vehicle, in particular a motor vehicle, in which the braking device can be put into a first operational state by operation of the electric motor in a first direction of rotation and into a second operational state by operation of the electric motor in a second direction of rotation different from the first direction of rotation, includes determining a quantity which characterizes an internal resistance of the electric motor, comparing the first quantity with a predeterminable first threshold value, controlling the electric motor for a predeterminable first control duration according to the direction of rotation which corresponds to a current operational state of the braking device when the result of the comparison is that the first quantity exceeds the first threshold value.

17 Claims, 5 Drawing Sheets

(51) Int. Cl.
 *B60T 8/171* (2006.01)
 *B60T 13/74* (2006.01)

(56) References Cited

U.S. PATENT DOCUMENTS

| | | | | |
|---|---|---|---|---|
| 8,630,780 B2 * | 1/2014 | Bunk | ................... | B60T 8/1755 |
| | | | | 303/10 |
| 2004/0016609 A1 * | 1/2004 | Takeda | ................. | F16D 55/227 |
| | | | | 188/73.31 |
| 2006/0181819 A1 * | 8/2006 | Nomura | ............... | B62D 5/0496 |
| | | | | 361/31 |
| 2013/0226426 A1 * | 8/2013 | Baehrle-Miller | ..... | B60T 13/588 |
| | | | | 701/70 |
| 2014/0142828 A1 * | 5/2014 | Harada | ................ | B60T 13/146 |
| | | | | 701/70 |
| 2014/0200784 A1 * | 7/2014 | Nohira | ................. | B60T 13/741 |
| | | | | 701/70 |
| 2015/0217738 A1 * | 8/2015 | Blattert | ................... | B60T 7/122 |
| | | | | 701/70 |
| 2015/0360667 A1 * | 12/2015 | Yasui | ................ | F16D 55/22655 |
| | | | | 188/72.1 |
| 2016/0032995 A1 * | 2/2016 | Nishino | ................ | F16D 55/226 |
| | | | | 188/72.3 |

FOREIGN PATENT DOCUMENTS

| | | |
|---|---|---|
| DE | 10 2015 007 856 A1 | 12/2015 |
| DE | 10 2015 214 346 A1 | 2/2016 |
| JP | 2003-237605 A | 8/2003 |
| JP | 2006-211825 A | 8/2006 |
| JP | 2010-13101 A | 1/2010 |
| JP | 2010-100112 A | 5/2010 |
| JP | 2015-142435 A | 8/2015 |
| JP | 2017-53490 A | 3/2017 |

* cited by examiner

METHOD AND APPARATUS FOR OPERATING AN ELECTRIC MOTOR FOR AN ELECTRIC BRAKING DEVICE

This application is a 35 U.S.C. § 371 National Stage Application of PCT/EP2019/063490, filed on May 24, 2019, which claims the benefit of priority to Serial No. DE 10 2018 211 239.8, filed on Jul. 7, 2018 in Germany, the disclosures of which are incorporated herein by reference in their entirety.

BACKGROUND

The disclosure relates to a method for operating an electric motor for an electric braking device, in particular for an electric parking brake of a vehicle, in particular motor vehicle, wherein the braking device can be moved to a first operating state by operation of the electric motor in a first direction of rotation and to a second operating state by operation of the electric motor in a second direction of rotation which is different from the first direction of rotation.

The disclosure further relates to a corresponding apparatus, to a controller for an electric braking device, and to an electric braking device.

It is known to monitor electrical lines for an electric motor, as is used in an electric braking device of the type mentioned at the outset, for example for a so-called line break, that is to say disconnection of at least one electrical line of the electric motor in such a way that actuation of the electric motor is no longer (reliably) possible. One disadvantage of the known approaches is that, under certain circumstances, faulty identification can lead to a line break, that is to say that, under certain circumstances, the conclusion that there is a line break is also drawn in the known methods even though this is not actually the case.

SUMMARY

The object of the disclosure is to improve a method of the kind mentioned at the outset to the effect that said disadvantages can be reduced or avoided.

In preferred embodiments, it is provided that the method comprises the following steps: determining a first variable which characterizes an internal resistance of the electric motor, comparing the first variable with a prespecifiable first threshold value, actuating the electric motor for a prespecifiable first actuation period in line with that direction of rotation which corresponds to a current operating state of the braking device if the comparison shows that the first variable exceeds the first threshold value.

According to the applicant's investigations, the incorrect conclusion that there is a line break can be drawn in the conventional approaches mentioned at the outset when the electric motor has not been activated for a relatively long time and consequently the electric braking device has not been used for a relatively long time. In these cases, components of a commutation system of the electric motor may oxidize, this leading to a higher internal resistance of the electric motor. This in turn may be incorrectly detected as a line break in the event of evaluation for a line break which is based, for example, on evaluation of an electrical resistance of the lines.

However, the principle according to the embodiments advantageously enables an undesired oxide layer in the region of the components of the commutation system to be removed, so that resistance-based methods for monitoring for a line break are less susceptible to faults. The oxide layer is removed, in particular, by the above-described actuation of the electric motor for the prespecifiable first actuation period in line with that direction of rotation which corresponds to the current operating state of the braking device. As a result, it is advantageously simultaneously ensured that owing to said actuation for the prespecifiable first actuation period there is no changeover in the braking device from its current operating state to another operating state, this increasing safety. In particular, it is possible in this way to advantageously prevent the braking device from being moved from an active or closed state to a non-active or open state, and vice versa, by the actuation. It is further advantageously possible to establish whether said undesired oxide layer is possibly present in the region of the commutation system by means of said threshold value comparison of the first variable. If this is the case, said actuation can take place for the first actuation period in preferred embodiments.

In further preferred embodiments, a first operating state of the braking device can correspond, for example, to a closed state (braking device active), while a second operating state of the braking device corresponds, for example, to an open state (braking device inactive). In further embodiments, a state transition from the first operating state to the second operating state, and vice versa, can take place by respective actuation of the electric motor with a corresponding direction of rotation over a prespecifiable state change actuation period. The first actuation period, which involves actuation for removing the oxide layer, is particularly preferably substantially less than, in particular at least one order of magnitude, preferably more than two orders of magnitude, less than the state change actuation period which involves a desired changeover between the possible operating states of the braking device.

The method according to the embodiments can be executed, for example, by means of an apparatus for operating the electric motor. For example, the apparatus can also be part of a controller for the electric braking device or correspond to the controller.

In further preferred embodiments, it is provided that the determination, and optionally also the comparison, is/are executed during or after, in particular immediately after, initialization of the apparatus. A comparable situation also applies for corresponding actuation for the first actuation period if the first variable exceeds the first threshold value. As a result, the principle according to the embodiments can advantageously be used in those operating states of the apparatus in which there is a comparably high probability of the presence of an oxide layer in the region of the commutation system of the electric motor.

In further preferred embodiments, it is provided that the current operating state of the braking device is determined, wherein, in particular, the current operating state of the braking device is determined before the actuation. As a result, it is possible to reliably establish the direction of rotation with which the electric motor is intended to be actuated during the first actuation period. In further preferred embodiments, determination can take place, for example, by evaluating a status variable (e.g. bit flag) which can be at least temporarily stored by the apparatus. In further embodiments, it is provided that the actuation of the electric motor takes place with a direction of rotation which corresponds to the inactive operating state during the first actuation period when the braking device is inactive, and that the actuation of the electric motor takes place with a direction of rotation which corresponds to the active operating state during the first actuation period when the braking device is active.

In further preferred embodiments, it is provided that the steps of determining the first variable, and/or of comparison and/or of actuation, are repeated, wherein in particular the steps of determining the first variable, and/or of comparison and/or of actuation are periodically repeated. In further preferred embodiments, the step of determining the first variable can comprise, for example, determining an electrical resistance between the electrical connections of the electric motor and/or determining a voltage drop at the electrical connections of the electric motor.

In further preferred embodiments, it is provided that the steps of determining the first variable, and of comparison and of actuation, are repeated for a prespecifiable maximum number of repetitions, wherein a different actuation period can be selectively prespecified for the actuation step, wherein in particular the different actuation period has values of between approximately 1 microsecond and approximately 100 milliseconds, in particular values of between approximately 20 microseconds and approximately 20 milliseconds. In further embodiments, it is provided that the actuation period is increased with the number of repetitions in order to continuously increase the actuation energy for the electric motor and therefore the probability of re-establishing a regular, comparatively low, internal resistance.

In further preferred embodiments, it is provided that a first actuation period in the range of between approximately 1 microsecond, μs, and approximately 100 μs, in particular in the range of between approximately 20 μs and approximately 60 μs, is selected for initial actuation, wherein in particular a second actuation period in the range of between approximately 1 millisecond, ms, and approximately 20 ms, in particular of approximately 5 ms, is selected for second actuation.

Further advantageous aspects relate to the use of the method according to the embodiments for removing an oxide layer from at least one component of a commutation system of the electric motor.

In further preferred embodiments, it is also conceivable that only actuation for the first actuation period in line with the above embodiments (that is to say in particular in a rotation direction of the electric motor which corresponds to the current operating state of the braking device) is executed, in particular without the steps of determining the first variable and of comparing the first variable with the first threshold value. As a result, the expenditure is reduced, and the actuation for the first actuation period can be executed as it were prophylactically. If there is a deterioration in contact in the region of the commutation system, e.g. caused by said oxide layer, this is accordingly removed without a check first having been made as to whether there actually is a deterioration in contact and how pronounced it is. If there is currently no deterioration in contact, the actuation for the first actuation period is still executed. In this aspect, the actuation for the first actuation period can preferably be executed periodically.

Further advantageous aspects relate to the use of the method according to the embodiments for a restored function check of the electric motor and/or of the electric braking device. If, for example by a conventional method (or the described comparison with the first threshold value) for determining a line break, it has been determined that there is a line break in the electric motor (or an increased internal resistance, for example caused by an oxide layer in the region of a commutation system of the electric motor), the principle according to the embodiments can preferably be applied, for example in further preferred embodiments comprising the steps of determining the first variable, comparing the first variable with the first threshold value, and possibly actuating the electric motor, in particular in order to remove an oxide layer which may be present and has led to a line break possibly being incorrectly determined. Then, the conventional method for determining the line break (or the described comparison with the first threshold value) can, for example, be executed once again, this not once again leading to a line break (or increased internal resistance) when the principle according to the embodiments has been successfully executed because the oxide layer which may be present has been removed by the actuation of the electric motor for the first actuation period. This corresponds to said restored function check of the electric motor or of the braking device.

Without applying the principle according to the embodiments, there is a risk of a line break being incorrectly identified on account of an increase in resistance caused by an oxide layer in the region of the commutation system and of the braking device accordingly sometimes being rendered unusable even though there is actually no line break but rather "only" said oxide layer being present in the region of the commutation system.

In further preferred embodiments, actuation according to the principle of the embodiments can be repeated for the restored function check, wherein in particular an actuation period is varied for different repetitions. In further advantageous embodiments, it is provided that a fault response, for example comprising signaling and/or making an entry into a fault memory or the like, is initiated after an unsuccessful (in particular initial) restored function check. In further preferred exemplary embodiments, it is provided that the braking device is released depending on at least one previously executed restored function check according to the embodiments. In further preferred embodiments, it is provided that the active restored function check according to the above-described embodiments takes place immediately after an increased transfer resistance of the electric motor is identified. In further preferred embodiments, it is provided that an active restored function check takes place the next time it is identified that a vehicle containing the braking device comes to a stop.

Further preferred embodiments relate to an apparatus for operating an electric motor for an electric braking device, in particular for an electric parking brake of a vehicle, in particular motor vehicle, wherein the braking device can be moved to a first operating state by operation of the electric motor in a first direction of rotation and to a second operating state by operation of the electric motor in a second direction of rotation which is different from the first direction of rotation, wherein the apparatus is designed for executing the following steps: determining a first variable which characterizes an internal resistance of the electric motor, comparing the first variable with a prespecifiable first threshold value, actuating the electric motor for a prespecifiable first actuation period in line with that direction of rotation which corresponds to a current operating state of the braking device if the comparison shows that the first variable exceeds the first threshold value.

In further preferred embodiments, the apparatus is designed for executing the method according to the above-described embodiments.

In further preferred embodiments, said restored function check can be executed, for example, by the apparatus. To this end, the apparatus can have, for example, a computer device and an associated memory device and also a corresponding computer program and/or a hardware circuit which is designed for controlling the corresponding processes. For example, in further preferred embodiments, the apparatus can also have at least one application-specific integrated circuit (ASIC) which is designed for executing the method according to the embodiments.

In further preferred embodiments, it is also conceivable for an electric braking device to be controlled by an apparatus or a controller according to the embodiments in order to execute aspects of the method according to the embodiments. For example, in further preferred embodiments, the apparatus can determine an increased internal resistance of the electric motor and then request renewed actuation of the braking device in a defined direction according to the principle of the present embodiments via an interface to the electric braking device. Here, the braking device will implement the requested actuation, as a result of which actuation of the electric motor of the braking device can likewise be realized within the meaning of the above-described embodiment for the prespecifiable first actuation period, in particular for removing an oxide layer in the commutation system of the electric motor.

Further preferred embodiments relate to a controller for an electric braking device, in particular for an electric parking brake of a vehicle, in particular motor vehicle, wherein the controller has at least one apparatus according to the embodiments. As an alternative, the controller can also be formed by the apparatus.

Further preferred embodiments relate to an electric braking device, in particular electric parking brake of a vehicle, in particular motor vehicle, wherein the braking device has at least one apparatus and/or one controller according to the embodiments.

BRIEF DESCRIPTION OF THE DRAWINGS

Further features, opportunities for application and advantages of the disclosure can be found in the following description of exemplary embodiments of the disclosure which are shown in the figures of the drawing. In this context, all features described or shown, separately or in any combination, form the subject matter of the disclosure, regardless of their summary in the claims or the back-references therein and also regardless of their wording or illustration in the description or in the drawing.

In the drawing.

DETAILED DESCRIPTION

Figure 1:
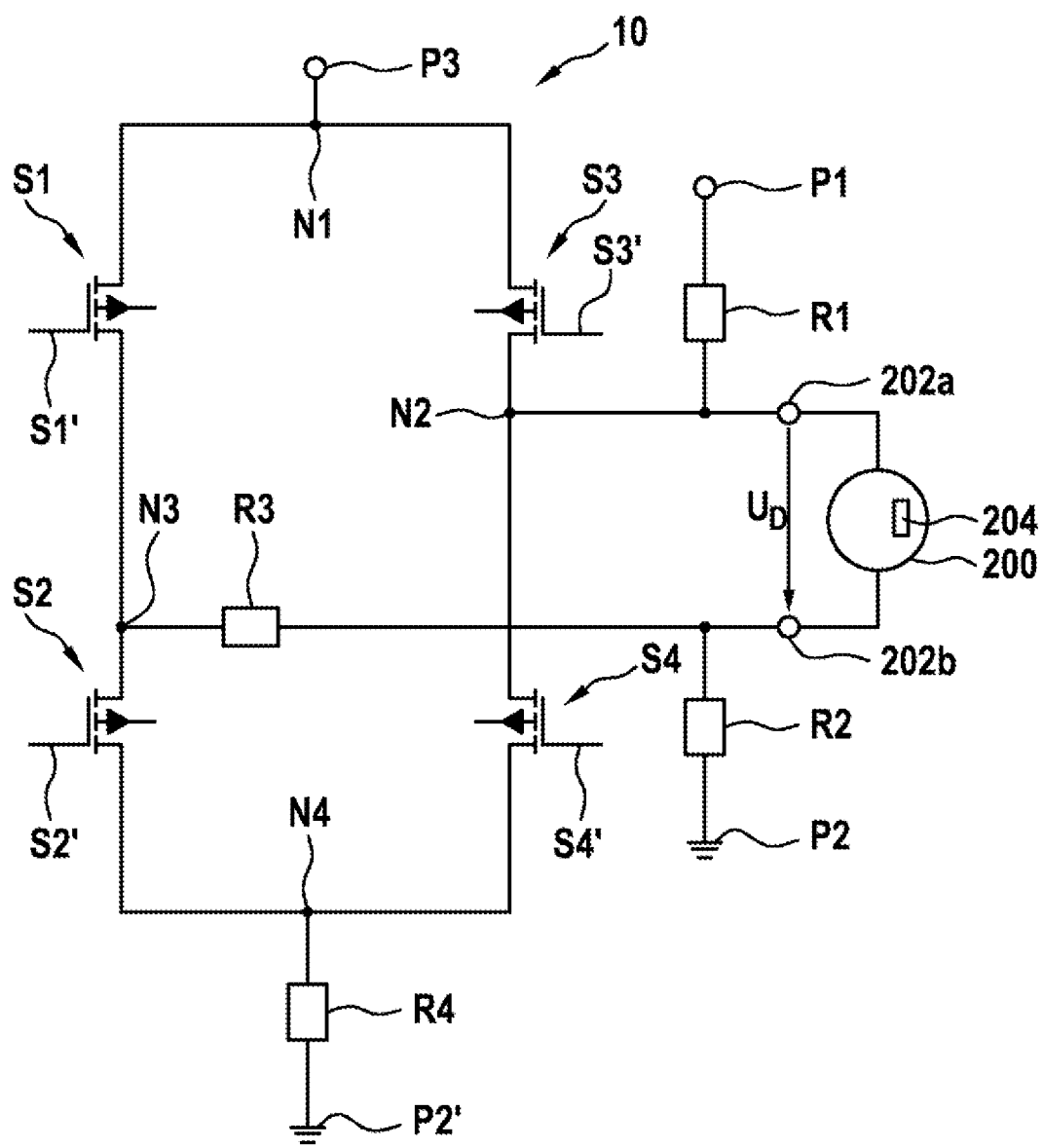
FIG. 1 schematically shows a simplified circuit for actuating an electric motor according to one embodiment, FIG. 2A schematically shows a simplified block diagram of an electric braking device according to one embodiment, FIG. 2B schematically shows a simplified block diagram of a controller according to one embodiment.

FIG. 1 schematically shows a simplified circuit for actuating an electric motor 200 for an electric braking device according to one embodiment. The electric motor 200 has a first electrical connection 202a and a second electrical connection 202b and, as is clear from FIG. 1, is connected electrically in series to a first resistor R1 and to a second resistor R2. In preferred embodiments, the resistors R1, R2 can be designed as a so-called pull-up resistor (R1) and, respectively, pull-down resistor (R2), that is to say can be designed to "pull" the first connection 202a to a first electrical reference potential P1 and to "pull" the second connection 202b to a second electrical reference potential P2.

Furthermore, the electric motor 200 has a, preferably mechanical, commutation system 204. One connection, at the top in FIG. 1, of the first resistor R1 is connected to the first electrical reference potential P1, and one connection, at the bottom in FIG. 1, of the second resistor R2 is connected to the second electrical reference potential P2, for example to the ground potential. If the first reference potential P1 is different from the second reference potential P2, a current flow is produced through the series circuit of the components R1, 200, R2, which current flow is dependent, amongst other things, on an electrical internal resistance of the electric motor 200. Accordingly, a voltage drop U D is produced between the electrical connections 202a, 202b of the electric motor 200.

The series circuit of components R1, 200, R2 can be used, for example, for electrically checking the electric motor 200 or its connections 202a, 202b, wherein in particular a line break, that is to say for example an interruption in at least one of the electrical connections 202a, 202b, can be identified. As soon as a line break has been identified, a fault response can be initiated. Furthermore, an increased internal resistance of the electric motor 200 can also be determined by means of the series circuit R1, 200, R2, such as occurs for example in the event of oxidation of the commutation system 204 or of components of the commutation system 204. In general, the series circuit R1, 200, R2 renders possible so-called passive monitoring, that is to say monitoring of the internal resistance of the electric motor 200 or its connections, without actuation of the electric motor 200 being required for this purpose.

In the present case, an H-bridge 10 having four semiconductor switches S1, S2, S3, S4 is provided by way of example for actuating the electric motor 200. The semiconductor switches can be actuated by corresponding control connections S1', S2', S3', S4', for example gate electrode connections in the case of field-effect transistors S1, S2, S3, S4. A first circuit node N1 of the H-bridge 10 is connected to a third reference potential P3 which corresponds for example to an on-board electrical system voltage of a motor vehicle. A second circuit node N2 of the H-bridge 10 is connected to the first connection 202a of the electric motor 200. A third circuit node N3 of the H-bridge 10 is connected to the second connection 202b of the electric motor 202 via a third resistor R3. A fourth circuit node N4 of the H-bridge 10 is connected to a further reference potential P2', that can for example be identical to the second reference potential P2, that is to say by way of example to the ground potential in the present case, via a fourth resistor R4.

In order to actuate the electric motor 200 in line with a first direction of rotation, the second semiconductor switch S2 and the third semiconductor switch S3 is switched on, by corresponding actuation of the control connections S2', S3'. The other two semiconductor switches S1, S4 are switched off. This results in current flow from the first circuit node N1, via the third semiconductor switch S3 and the second circuit node N2, to the first electrical connection 202a of the electric motor 200, through the electric motor 200, further via the second electrical connection 202b of the electric motor 200, the third resistor R3, the third circuit node N3, the second semiconductor switch S2, the fourth circuit node N4, and finally via the fourth resistor R4 to the ground potential P2'. In preferred embodiments, the resistors R3, R4 have a comparatively low, resistance (preferably less than or equal to approximately 1 ohm, further preferably less than or equal to approximately 0.1 ohm), and are therefore designed as shunt resistors.

Figure 2A:
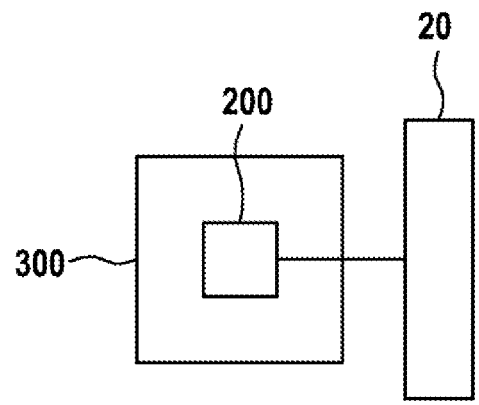

In preferred embodiments, the electric motor 200 can be actuated as described above (in particular over a prespecifiable state change actuation period) in order to move said electric motor or the electric braking device 300 which can be operated by it, cf. FIG. 2A, to a first operating state (e.g. braking device active) in which it exerts a braking action on at least one wheel 20 for example of a motor vehicle in a manner which is known per se.

In further preferred embodiments, the electric motor 200 (FIG. 1) can also be actuated in such a way that it rotates in a second direction of rotation which is different from the first direction of rotation. To this end, the first semiconductor switch S1 and the fourth semiconductor switch S4 is switched on, and the other two semiconductor switches S2, S3 are switched off. This results in current flow from the third reference potential P3 via the further components N1, S1, N3, R3, 202b, 200, 202a, N2, S4, R4, P2', as a result of which the electric motor 200 rotates in the second direction of rotation. As a result, the braking device 300 can be moved to a second operating state (e.g. braking device inactive). The corresponding actuation can once again be maintained in particular over a prespecifiable state change actuation period in order to ensure reliable transition to the second operating state.

Figure 3A:
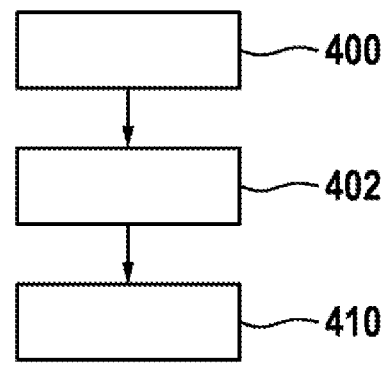
FIG. 3A shows a simplified flowchart of a method according to one embodiment.

In preferred embodiments, the execution of the method described below by way of example with reference to the simplified flowchart according to FIG. 3A is provided. A first variable, which characterizes an internal resistance of the electric motor 200, is determined in step 400. In this case, the first variable can correspond, for example, to the voltage drop Up (FIG. 1) (or directly to the internal resistance). The first variable can also be determined in particular when all four semiconductor switches S1, S2, S3, S4 are switched off, and consequently the electric motor 200 is not actuated. This is rendered possible by applying the reference potentials P1, P2 to the first resistor R1 and to the second resistor R2 (passive monitoring).

The first variable is compared with a prespecifiable first threshold value in a subsequent step 402 (FIG. 3A). In this case, the first threshold value is advantageously selected such that the first variable does not exceed the first threshold value in the event of regular operation of the electric motor 200, but does exceed the first threshold value in the event of oxidation of a commutation system of the electric motor 200. As a result, oxidation of the commutation system 204 of the electric motor 200 can be identified by the comparison in step 402. By way of example, the first threshold value—if it relates to said internal resistance—can be selected in the range of from approximately 700 mS) (milliohms) to approximately 1000 mS).

In step 410, the electric motor 200 can be actuated for a prespecifiable first actuation period in line with that direction of rotation which corresponds to the current operating state of the braking device 300 for a prespecifiable first actuation period when the comparison 402 shows or has shown that the first variable exceeds the first threshold value. Therefore, owing to the actuation in step 410, the possibly oxidized commutation system 204 of the electric motor 200 can advantageously have electrical energy applied to it by the actuation for the first actuation period, which electrical energy breaks through or burns off or removes the corresponding oxide layer.

This advantageously simultaneously ensures that owing to said actuation for the prespecifiable first actuation period there is no changeover in the braking device 300 from its current operating state to another operating state, this increasing safety. In particular, it is possible in this way to advantageously prevent the braking device 300 from being moved from an active or closed state to a non-active or open state by the actuation. It is further advantageously possible to establish whether said undesired oxide layer is possibly present in the region of the commutation system by means of said threshold value comparison 402 of the first variable. If this is the case, said actuation can take place for the first actuation period in preferred embodiments.

In further preferred embodiments, a first operating state of the braking device 300 can correspond, for example, to a closed state (braking device active), while a second operating state of the braking device corresponds, for example, to an open state (braking device inactive). In further embodiments, a state transition from the first operating state to the second operating state, and vice versa, can take place by respective actuation of the electric motor 200 with a corresponding direction of rotation over the abovementioned state change actuation period. The first actuation period, which involves actuation for removing the oxide layer, is particularly preferably substantially less than, in particular at least one or even two orders of magnitude, less than the state transition actuation period which involves an intended changeover between the possible operating states of the braking device 300.

Figure 2B:
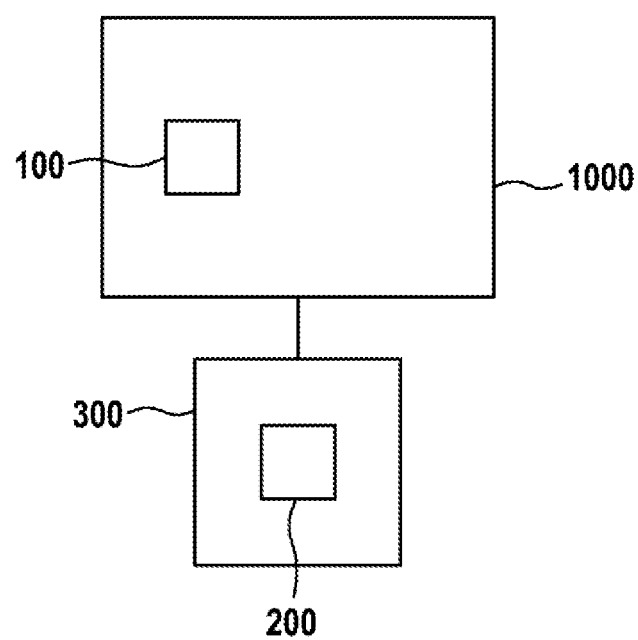

The method according to the embodiments can be executed, for example, by means of an apparatus 100. cf. FIG. 2B, for operating the electric motor 200. For example, the apparatus 100 can also be part of a controller 1000 for the electric braking device 300 or correspond to the controller.

Figure 3B:
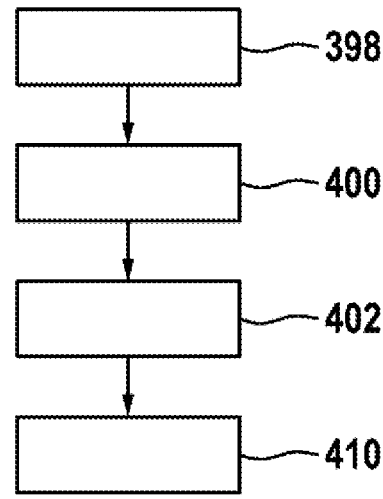
FIG. 3B shows a simplified flowchart of a method according to a further embodiment.

In further preferred embodiments, it is provided that the determination 400, and optionally also the comparison 402, is/are executed during or after, in particular immediately after, initialization 398 of the apparatus 100, compare the flowchart from FIG. 3B. A comparable situation also applies for corresponding actuation 410 for the first actuation period if the first variable exceeds the first threshold value. As a result, the principle according to the embodiments can advantageously be used in those operating states of the apparatus 100 in which there is a comparably high probability of the presence of an oxide layer in the region of the commutation system 204 of the electric motor 200. In further preferred embodiments, the method can also be periodically repeated or executed at the end of a driving cycle of a motor vehicle which contains a corresponding braking device 300.

In further preferred embodiments, it is provided that the current operating state of the braking device 300 (FIG. 2A) is determined, wherein in particular the current operating state of the braking device 300 is determined before the actuation 410 (FIG. 3A). As a result, it is possible to reliably establish the direction of rotation with which the electric motor 200 is intended to be actuated during the first actuation period. As already described above with reference to FIG. 1, the direction of rotation of the electric motor 200 can be controlled or selected by selecting the semiconductor switches of the H-bridge 10 which are to be activated.

In further preferred embodiments, determination of the current operating state of the braking device 300 can take place, for example, by evaluating a status variable (e.g. bit flag) which can be at least temporarily stored by the apparatus 100. In further embodiments, it is provided that the actuation of the electric motor 200 takes place with a direction of rotation which corresponds to the inactive operating state during the first actuation period when the braking device 300 is inactive, and that the actuation of the electric motor 200 takes place with a direction of rotation which corresponds to the active operating state during the first actuation period when the braking device 300 is active.

In further preferred embodiments, it is provided that the steps of determining 400 the first variable, and/or of comparison 402 and/or of actuation 410, are repeated, wherein in particular the steps of determining the first variable, and/or of comparison and/or of actuation, are periodically repeated. In further preferred embodiments, the step 400 of determining the first variable can comprise, for example, determining an electrical resistance between the electrical connections 202a, 202b of the electric motor 200 and/or determining the voltage drop Up at the electrical connections 202a, 202b of the electric motor 200.

Further advantageous aspects relate to the use of the method according to the embodiments for removing an oxide layer from at least one component of a commutation system 204 of the electric motor 200. In other words, the method described above by way of example with reference to FIG. 3A can be executed in an, in particular periodically, repeated manner in order to remove an undesired oxide layer in the region of the commutation system 204 of the electric motor 200 in a targeted manner. In this way, incorrect results when checking the configuration according to FIG. 1 for a line break can advantageously be countered.

Further advantageous aspects relate to the use of the method according to the embodiments for a restored function check of the electric braking device 300. If, for example by a conventional method for determining a line break, it has been determined that there is a line break in the electric motor 200, the principle according to the embodiments can preferably be applied, for example in further preferred embodiments comprising the steps of determining 400 the first variable, comparing 402 the first variable with the first threshold value, and possibly actuating 410 the electric motor 200, in particular in order to remove an oxide layer which may be present and has led to a line break possibly being incorrectly determined. Then, the conventional method for determining the line break can for example be executed once again, this not once again leading to a line break when the principle according to the embodiments has been successfully executed because the oxide layer which may be present has been removed by the actuation 410 of the electric motor 200. This corresponds to said restored function check of the electric motor 200. Without applying the principle according to the embodiments, there is a risk, when executing a conventional check for a line break, of a line break being incorrectly identified and accordingly the braking device 300 sometimes being rendered unusable even though there is actually no line break, but rather said oxide layer may be in the region of the commutation system 204.

Further preferred embodiments relate to an apparatus 100 for operating an electric motor for an electric braking device, in particular for an electric parking brake of a vehicle, in particular motor vehicle, wherein the braking device can be moved to a first operating state by operation of the electric motor in a first direction of rotation and to a second operating state by operation of the electric motor in a second direction of rotation which is different from the first direction of rotation, wherein the apparatus is designed for executing the following steps: determining a first variable which characterizes an internal resistance of the electric motor, comparing the first variable with a prespecifiable first threshold value, actuating the electric motor for a prespecifiable first actuation period in line with that direction of rotation which corresponds to a current operating state of the braking device if the comparison shows that the first variable exceeds the first threshold value. In further preferred embodiments, the apparatus 100 is designed for executing the method according to the above-described embodiments.

Further preferred embodiments relate to a controller 1000 (FIG. 2B) for an electric braking device 300, in particular for an electric parking brake of a vehicle, in particular motor vehicle, wherein the controller 1000 has at least one apparatus 100 according to the embodiments. As an alternative, the controller can also be formed by the apparatus 100.

Further preferred embodiments relate to an electric braking device 300, in particular electric parking brake of a vehicle, in particular motor vehicle, wherein the braking device has at least one apparatus and/or one controller according to the embodiments.

Further preferred embodiments will be described below with reference to FIGS. 4 and 5.

Figure 4:
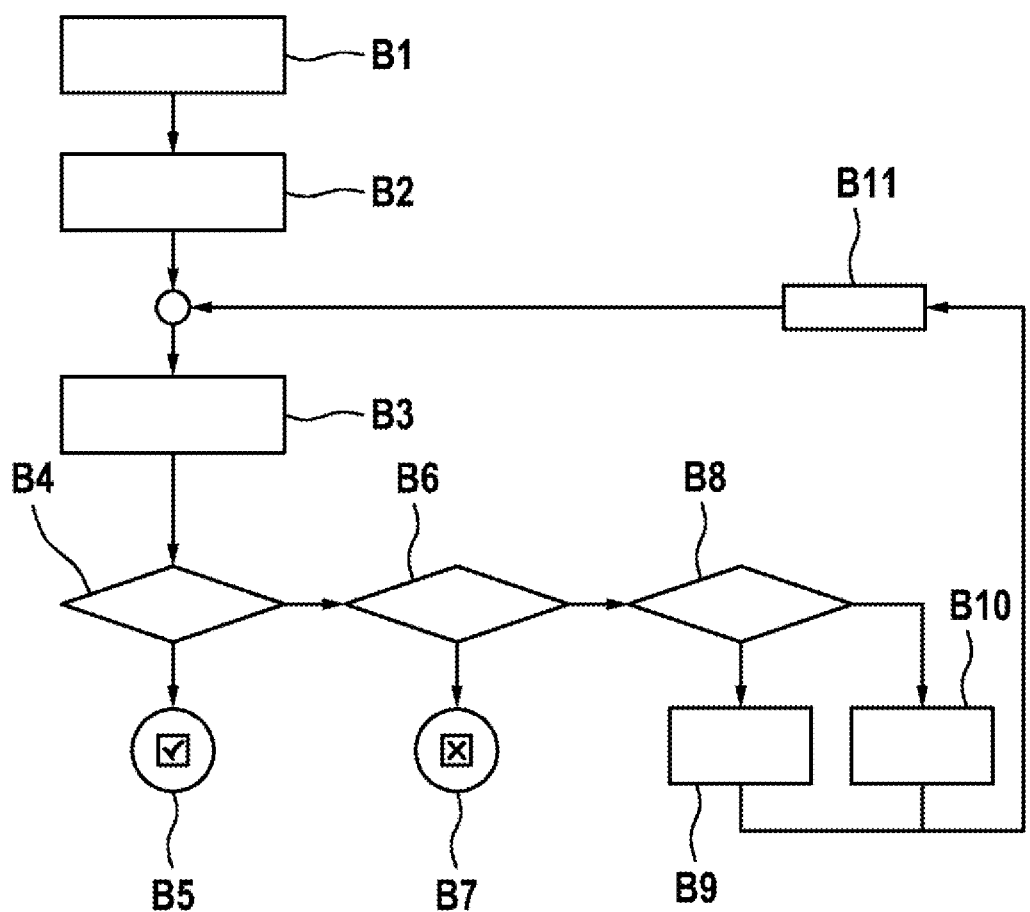
FIG. 4 shows a simplified flowchart of a method according to a further embodiment.
Figure 5:
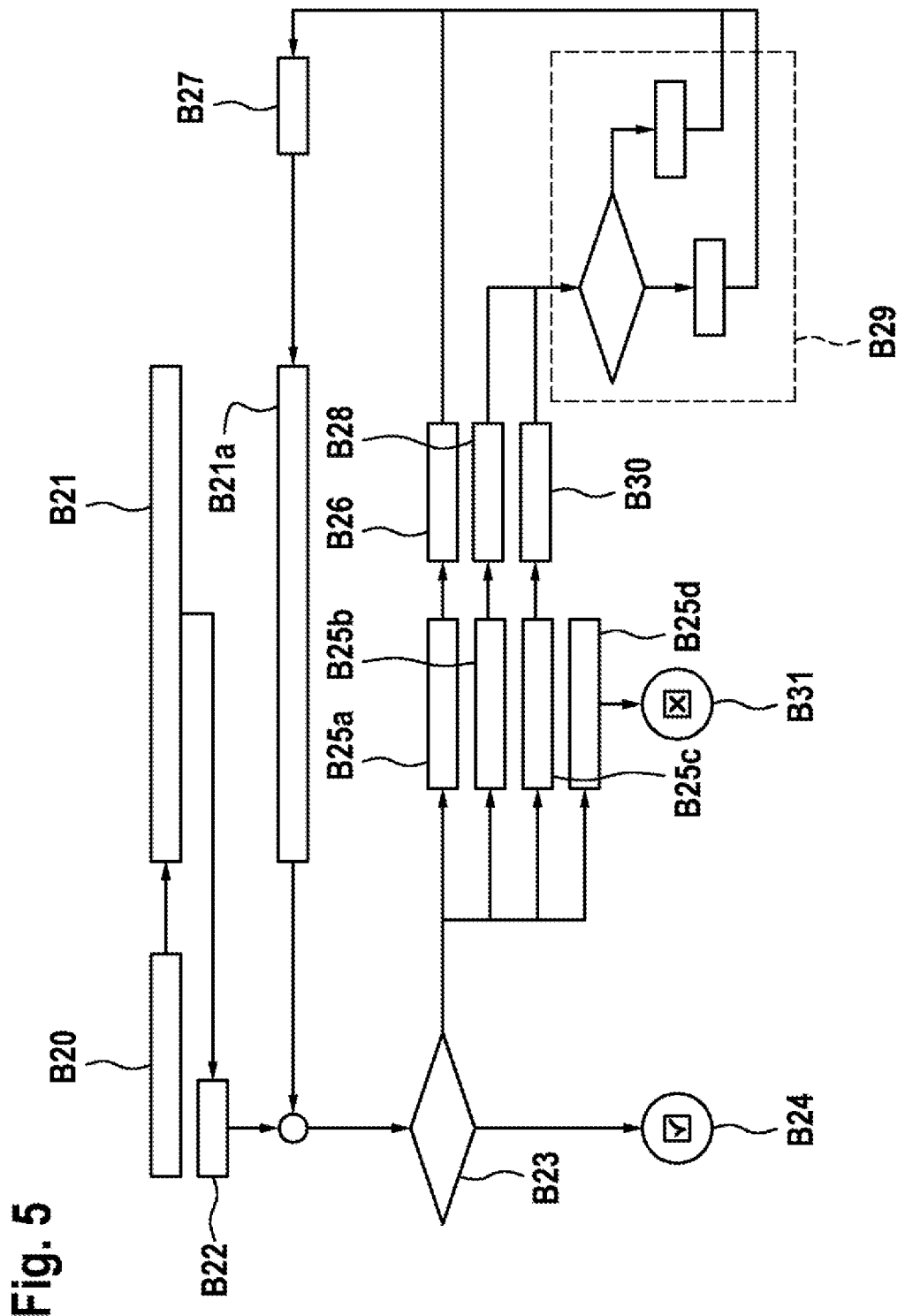
FIG. 5 shows a simplified flowchart of a method according to a further embodiment.

In FIG. 4, block B1 represents an initialization phase of the controller 1000 (FIG. 3B) in which the controller 1000 checks, for example, its own functioning and in particular ensures that all functions are secured and provided. In block B2, a counter variable n is initialized, in particular set to zero, n=0.

Then, in blocks B3 and B4, a check is made for a line break, for example by means of the reference potentials P1, P2, compare FIG. 1, and there is an evaluation of the differential voltage Up between the connections 202a, 202b in block B4. In particular, there is no active actuation of the electric motor 200 during the check B3, B4, and accordingly the semiconductor switches S1 to S4 are deactivated, that is to say switched to high impedance.

In preferred embodiments, the check according to blocks B3, B4 can correspond, for example, to the execution of steps 400 and 402 according to FIG. 3A. If the check according to blocks B3, B4 shows that there is no line break, the electric braking device 300 is enabled, and to this end the method branches to block B5.

However, if the check according to block B4 shows that there is a line break or increased internal resistance of the electric motor 200 (e.g. differential voltage U D is greater than the prespecifiable first threshold value), the method branches from block B4 to block B6. The counter variable n is evaluated in block B6. In particular, a check is made to determine whether the counter variable has a value of greater than zero, and consequently the process described above with reference to FIG. 4 has already been fully executed at least once ("n>0"). If this is the case, the method branches to block B7 in which, for example, a fault response can be initiated. The fault response can comprise, for example, outputting an item of fault information to a driver of the motor vehicle containing the electric braking device 300.

If the counter variable n has the value zero, and consequently the process described according to FIG. 4 has not already been fully executed, the method branches from block B6 to block B8. In block B8, it is determined whether the electric braking device 300 is in an active operating state ("locked"). If this is the case, the method branches to block B9, in which the electric motor 200 of the electric braking device 300 is actuated for the prespecifiable first actuation period in line with that direction of rotation which corresponds to the active state of the braking device 300 ("Turn2Lock"). As a result, an oxide layer which may be present is removed from the commutation system 104 of the electric motor 200, without this resulting in an undesired change in the operating state of the braking device 300.

If it is determined in block B8 that the braking device 300 is in an inactive operating state, the method branches to block B10 in which the electric motor 200 of the electric braking device 300 is actuated for the prespecifiable first actuation period in line with that direction of rotation which corresponds to the inactive state of the braking device 300 ("Turn2Release"). As a result, an oxide layer which may be present is also removed from the commutation system 104 of the electric motor 200, without this resulting in an undesired change in the operating state of the braking device 300.

After the actuation for the first actuation period, corresponding to block B9 or B10, the counter variable n is incremented in block B11, e.g. n=n+1. As a result, it is clear in the following steps that the actuation according to the principle of the embodiments has already taken place at least once. After block B11, a transition is made back to block B3 (check). If, according to expectations, the actuation according to block B9 or block B10 has caused removal of the oxide layer (with the effect that the expected electrical conductivity of the commutation system is re-established), it is now not once again incorrectly identified that there is a line break when the check according to block B3 is executed once again, compare block B4, and a transition is made to block B5, this corresponding to a restored function check.

However, if the check according to block B4 shows that the problem persists, a transition is again made to block B6 in which the counter variable n is evaluated. If the counter variable n has a value of greater than zero, this being the case according to the process described by way of example at present, the method branches to block B7. This can be justified since actuation according to the principle of the embodiments has already taken place, compare block B9 or B10, and since there has obviously been no improvement in the situation with respect to the checking according to blocks B3, B4 as a result. This scenario also occurs, for example, when there is actually a line break. However, when there is an oxide layer in the region of the commutation system 204 of the electric motor 200, which oxide layer can be removed by the actuation according to blocks B9, B10, a transition is made to block B5 after further execution of the check according to steps B3, B4, as already described above, this corresponding to the restored function check likewise already mentioned.

A further preferred embodiment will be described below with reference to the block diagram according to FIG. 5. In FIG. 5, block B2 represents an initialization phase of the controller 1000 (FIG. 3B) in which the controller 1000 checks, for example, its own functioning, and in particular ensures that all functions are secured and provided. In block B21, a preferably periodic or cyclical check is made as to whether the first variable, which characterizes the internal resistance of the electric motor 200, exceeds the prespecifiable first threshold value, and consequently whether the electric motor 200 has an increased internal resistance or transfer resistance for example in the region of its commutation system 204. If this is the case, a transition is made to block B22 in which a counter variable n is initialized, in particular set to zero, n=0.

In the following block B23, a check can optionally be made as to whether the increased internal resistance or transfer resistance established in block B21 is still present, that is to say even after initialization of the counter variable according to block B22. If this is not the case, the method branches to block B24.

However, if this is the case, the method branches to block B26 when the counter variable is at its initialization value (n=0), compare block B25a. In block B26, a motor test pulse, that is to say actuation in line with the principle according to the embodiments, is executed for the prespecifiable first actuation period and in particular in that direction of rotation which corresponds to a current operating state of the braking device 300. Particularly preferably, in block B26, the first actuation period can be selected, for example, at a few 10 μs, for example 40 μs or 60 μs or 80 μs or the like. The actuation of the electric motor 200 for this first actuation period can preferably be executed by an application-specific integrated circuit (ASIC) which is designed for actuating the semiconductor switches S1, . . . , S4 of the H-bridge 10 according to FIG. 1. As an alternative, this actuation can also be executed by a discrete logic circuit or the like. On account of the actuation according to block B26 constituting a comparatively short switch-on time for the electric motor 200, the electric motor will not rotate on account of this actuation because the quantity of energy input by means of the actuation B26 is not sufficient for this. Accordingly, in further preferred embodiments for the actuation according to block B26, the operating state which the braking device 300 is currently in can also be left out of consideration since, on account of the comparatively short first actuation period, any rotation of the electric motor 200 and therefore any possible accompanying change in operating state of the braking device are precluded. However, in further embodiments, for the actuation according to block B26, the current operating state of the braking device 300 can also be evaluated and the actuation of the electric motor 200 in line with (direction of rotation of) the current operating state can be executed.

The counter variable n is then incremented (n=n+1) in block B27 and a further check for a line break or increased internal resistance or transfer resistance of the electric motor 200 is made in block B21a, comparably to block B21. If the further check according to block B21a shows that there is no longer an increased internal resistance or transfer resistance of the electric motor 200 (compare block B23), the method branches to block B24, this corresponding to a successful restored function check.

However, if the further check according to block B21a shows that there is still an increased internal resistance, the method branches to block B28 when the counter variable has a value of n=1, compare block B25b. In block B28, a motor test pulse, that is to say actuation in line with the principle according to the embodiments, is once again executed, but this time for a prespecifiable second actuation period which is greater than the first actuation period, for example at least one order of magnitude greater than the first actuation period. In preferred embodiments, the second actuation period for block B28 can last, for example, for from approximately 1 ms to approximately 20 ms, preferably approximately 5 ms. In this case, the actuation of the electric motor 200 according to block B28 preferably takes place in line with that direction of rotation which corresponds to the current operating state of the braking device, once again in order to prevent an undesired change in operating state of the braking device by the actuation of the electric motor 200 according to block B28. The related evaluation of the current operating state of the electric motor 200 and the actuation according to block B28 in line with the correct direction of rotation is symbolized in FIG. 5 by the blocks B29 which correspond substantially to the blocks B8, B9, B10 according to FIG. 4.

A transition is then once again made to block B27 in which the counter variable is incremented. That is to say, after the further execution of block B27, the counter variable n has the value n=2. A further check B21a is then made as already described above with the option of the transition to block B24 if there is no longer an increased internal resistance. If, as before, there is an increased internal resistance, the method branches, by means of block B25c if n=2, to block B30 in which a further actuation of the electric motor, this time for the third actuation period which is preferably greater than the second actuation period, according to block B28 takes place. For example, the third actuation period can assume values of between approximately 10 ms and approximately 50 ms, in particular approximately 20 ms. It goes without saying that it is also necessary to ensure for the third actuation period that there is no undesired transition in the operating state of the braking device 300, this in turn being ensured by the blocks B29. If, even after the actuation with the third actuation period, compare blocks B30, B29, the regular, comparatively low, internal resistance of the electric motor 200 cannot be re-established, the method branches via blocks B27, B21a, B23, B25d to block B31 which represents a fault state. In block B31, provision can be made, for example, to initiate a fault response, for example to inform a driver of a motor vehicle which contains the braking device 300 about the state by means of acoustic and/or visual signaling and/or to make an entry into a fault memory.

If, after the actuation with the third actuation period, the regular, comparatively low, internal resistance of the electric motor 200 is re-established (by removing the oxide layer by means of the actuations B26, B20, B30, B29), a transition can be made from block B23 to block B24 starting at the value of the counter variable of n=3, this representing a successful restored function check.

It goes without saying that in further preferred embodiments both the number n of the different actuations according to blocks B26 to B30 described by way of example and also the respective actuation period for the corresponding actuation can be varied. For example, in further preferred embodiments, more than the four case distinctions (n=0, . . ., n=3) described by way of example with reference to FIG. 5 can be performed in order to allow an even more precisely classified method. In further embodiments, less than four case distinctions are also conceivable.

The principle according to the embodiments can advantageously be used for all electric braking devices 300, in particular those which are equipped with an electric motor 200 which is designed as a direct-current motor (DC motor). The principle according to the embodiments is particularly preferably suitable for those electric motors which have a mechanical commutation system 204.

In further preferred embodiments, it is also conceivable for only actuation 410 (FIG. 3A) for the first actuation period in line with the above embodiments (that is to say in particular in a direction of rotation of the electric motor 200 which corresponds to the current operating state of the braking device) to be executed, in particular without the steps of determining 400 the first variable and of comparing 402 the first variable with the first threshold value. As a result, the expenditure is reduced, and the actuation 410 for the first actuation period can be executed as it were prophylactically. If there is a deterioration in contact in the region of the commutation system 204, e.g. caused by said oxide layer, this is accordingly removed without a check first having been made as to whether there actually is a deterioration in contact and how pronounced it is. If there is currently no deterioration in contact, the actuation 410 for the first actuation period is still executed. In this aspect, the actuation 410 for the first actuation period can preferably be executed periodically.

The invention claimed is:

1. A method for operating an electric motor for an electric braking device configured to be moved to a first operating state by operation of the electric motor in a first direction of rotation and to a second operating state by operation of the electric motor in a second direction of rotation which is different from the first direction of rotation, the method comprising:
   determining a first variable which characterizes an internal resistance of the electric motor;
   comparing the first variable with a prespecifiable first threshold value; and
   actuating the electric motor for a prespecifiable first actuation period in line with one of the first and second directions of rotation that corresponds to a current operating state of the electric braking device if the comparison shows that the first variable exceeds the prespecifiable first threshold value.

2. The method as claimed in claim 1, wherein the determination of the first variable is executed during or immediately after initialization of an apparatus.

3. The method as claimed in claim 1, further comprising:
   determining the current operating state of the electric braking device before the actuating of the electric motor.

4. The method as claimed in claim 1, further comprising:
   repeating at least one of (i) the determining of the first variable, (ii) the comparing of the first variable with the prespecifiable first threshold value, and (iii) the actuating of the electric motor.

5. The method as claimed in claim 4, wherein:
   the determining of the first variable, the comparing of the first variable with the prespecifiable first threshold value, and the actuating of the electric motor are repeated for a prespecifiable maximum number of repetitions, and wherein
   a different actuation period is selectively prespecified for different repetitions of the actuating of the electric motor, the different actuation period selected from values of between approximately 1 microsecond and approximately 100 milliseconds.

6. The method as claimed in claim 5, wherein:
   the first actuation period is selected from a range of between approximately 1 microsecond and approximately 100 microseconds, and
   a second actuation period is selected from a range of between approximately 1 millisecond and approximately 20 milliseconds for a second actuation during the repeating of the actuating of the electric motor.

7. The method as claimed in claim 5, wherein the different actuation period is selected from values of between approximately 20 microseconds and approximately 20 milliseconds.

8. The method as claimed in claim 1, wherein the method is performed to remove an oxide layer from at least one component of a commutation system of the electric motor.

9. The method as claimed in claim 1, wherein the method is performed to check for a restored function of the electric braking device.

10. The method as claimed in claim 1, wherein the electric braking device is an electric parking brake of a motor vehicle.

11. The method as claimed in claim 1, further comprising:
periodically repeating at least one of (i) the determining of the first variable, (ii) the comparing of the first variable with the prespecifiable first threshold value, and (iii) the actuating of the electric motor.

12. An apparatus for operating an electric motor for an electric braking device configured to be moved to a first operating state by operation of the electric motor in a first direction of rotation and to a second operating state by operation of the electric motor in a second direction of rotation which is different from the first direction of rotation, the apparatus comprising:
a computer device configured to:
determine a first variable which characterizes an internal resistance of the electric motor;
compare the first variable with a prespecifiable first threshold value; and
actuate the electric motor for a prespecifiable first actuation period in line with one of the first and second directions of rotation that corresponds to a current operating state of the electric braking device if the comparison shows that the first variable exceeds the prespecifiable first threshold value.

13. The apparatus as claimed in claim 12, wherein the apparatus is configured to determine the first variable during or immediately after initialization of the apparatus.

14. The apparatus as claimed in claim 12, wherein the apparatus is included in a controller of the electric braking device.

15. The apparatus as claimed in claim 12, wherein the electric braking device is an electric parking brake of a motor vehicle.

16. An electric braking device comprising:
an electric motor configured to move the electric braking device into a first operating state by operating in a first direction of rotation and to move the electric braking device into a second operating state by operating in a second direction of rotation which is different from the first direction of rotation; and
at least one apparatus configured to:
determine a first variable which characterizes an internal resistance of the electric motor;
compare the first variable with a prespecifiable first threshold value; and
actuate the electric motor for a prespecifiable first actuation period in line with one of the first and second directions of rotation that corresponds to a current operating state of the electric braking device if the comparison shows that the first variable exceeds the prespecifiable first threshold value.

17. The electric braking device as claimed in claim 16, wherein the electric braking device is an electric parking brake of a motor vehicle.

* * * * *